March 13, 1962     P. KOLLSMAN     3,025,227
METHOD OF FRACTIONATION OF IONIC LIQUIDS
Filed Sept. 26, 1958     4 Sheets-Sheet 1

INVENTOR.
Paul Kollsman
BY Howard G. Russell
his ATTORNEY

INVENTOR.
Paul Kollsman
BY Howard G. Russell
his ATTORNEY

March 13, 1962 P. KOLLSMAN 3,025,227
METHOD OF FRACTIONATION OF IONIC LIQUIDS
Filed Sept. 26, 1958 4 Sheets-Sheet 3

INVENTOR.
Paul Kollsman
BY Howard G. Russell
his ATTORNEY 3,025,227
METHOD OF FRACTIONATION OF IONIC LIQUIDS
Paul Kollsman, 100 E. 50th St., New York, N.Y.
Filed Sept. 26, 1958, Ser. No. 763,751
18 Claims. (Cl. 204—180)

This invention relates to the art of separating constituents of a solution or mixture into fractions under the influence of an electric current.

My prior Patents Nos. 2,854,393 and 2,854,394, dated September 30, 1958, disclose methods and forms of apparatus for separating constituents of fluid mixtures under the influence of an electrical potential and an accelerating force, such as gravity or centrifugal acceleration.

The basic principle underlying the separation of the constituents is the fact that ions traveling from an ion source, for example a chamber containing an electrolyte, or the ions of the liquid to be separated into fractions, enlarge, or reduce their solvent shells when they pass from one medium of a certain ionic concentration into a medium of a different ionic concentration. The former medium may be an ionic liquid in a certain treatment chamber disposed between spaced electrodes, or an ion conductive filler in the pores of which a certain ionic concentration prevails, and the latter medium may be a barrier of a relatively high ionic concentration, for example a membrane. The filler, and/or the membrane, may be permselective in character, but this is not an essential prerequisite. They may also be amphoteric, either by reason of an inherent characteristic, or by reason of composition, for example by reason of being a mixture of anionic and cationic ion exchange particles which may or may not be bonded together.

When an ion in its travel towards an electrode passes from a zone or medium of a relatively low ionic concentration into another zone or medium of a higher ionic concentration, the ion loses a portion of its solvent shell with the result that an accumulation of solvent occurs in front of the zone or medium of higher ion concentration which may be a membrane. When, on the other hand, the ion passes from a zone or medium of high ionic concentration into a medium or zone of lower ionic concentration, the ion immediately seeks to enlarge its solvent shell and creates a scarcity of solvent in the exit zone.

Where permselective barriers are encountered which resist the passage of ions of a certain polarity, an accumulation of ions of that polarity occurs in front of the permselective barrier, and where an ion of a certain polarity emerges from a permselective barrier which is permeable to these ions, a zone of dilution is created. The last named phenomenon underlies the operation of electrodialytic concentrating and diluting apparatus which are well known in the art.

Concentration layers normally tend to move downwardly under the action of gravity, or tend to move in the direction of centrifugal force if subjected to centrifugal force. Layers of dilute tend to move in the opposite direction, so that in an apparatus having substantially vertical barriers pools of concentrate collect at the bottom of the certain compartments and pools of dilute collect at the top of the same or other compartments.

Within a concentrate pool ions of higher mobility, in turn, tend to assume a lower position than ions of lower mobility, assuming the concentrate to be under the influence of gravitational force. This phenomenon permits ions of the same polarity to be separated by withdrawal of liquid through vertically spaced or vertically fanned-out withdrawal ducts, as disclosed in my aforementioned patents.

It is not always desirable to permit substantial volumes of relatively high ionic concentration to accumulate because of the tendency of the ions to "leak" through the bordering ion passage resistant barrier. The ion passage resistance of the barrier, in other words its permselectivity, may be quite satisfactory for liquid of lower ionic concentration, but becomes increasingly poorer if the ionic concentration of the contacting liquid increases.

The present invention contemplates, among other improvements, the introduction of a donee liquid into the concentrate. This accomplishes several objects. Firstly, it reduces the ionic concentration at a zone or area where it normally would tend to be unnecessarily high, if it were not for the introduction of the donee liquid. Thus ionic leakage through the barriers is reduced. The inflow of the donee liquid further affects the ions in the concentrate differentially on the basis of their mobility, in that slower ions are disturbed and displaced to a greater extent than faster ions.

Assuming that concentrate settled under the influence of gravity in an apparatus having barriers extending in a general direction parallel to the force of gravity, as distinguished from a direction at right angles thereto, the slowest ions of the concentrate are moved to a higher level or stratum than if the donee liquid were not introduced and the fastest ions are displaced to a lesser extent. The ions are thus spread out over an enlarged vertical range and the separation of ions of the same polarity, but of different mobility, is facilitated.

The invention may be applied to a process and apparatus operating on the parallel flow principle as disclosed in my prior Patent No. 2,854,393, as well as to a process and apparatus operating on the series flow principle as disclosed in my prior Patent No. 2,854,394.

In the parallel flow apparatus the liquid to be treated usually flows from a point of inflow at one end of a treatment chamber to points of outflow near the other end of the same treatment chamber so that a number of individual flows of liquid are treated substantially alike during passage through separate, substantially parallel treatment chambers of the apparatus.

In the series flow apparatus, in distinction, the liquid to be treated enters the apparatus near one end and passes through the apparatus towards its other end by flowing from one treatment chamber to a subsequent treatment chamber and thence to still another treatment chamber, etc., so that the same volume of liquid passes through a series of chambers in succession.

The various objects, features and advantages of the invention will appear more fully from the detailed description which follows accompanied by drawings showing, for the purpose of illustration, preferred forms of apparatus for practicing the invention. The invention also consists in certain new and original features of construction and combination of elements, as well as steps and sequences of steps hereinafter set forth and claimed.

Although the characteristic features of the invention which are believed to be novel will be particularly pointed out in the claims appended hereto, the invention itself, its objects and advantages, and the manner in which it may be carried out may be better understood by referring to the following description taken in connection with the accompanying drawings forming a part of it in which:

Figure 1:
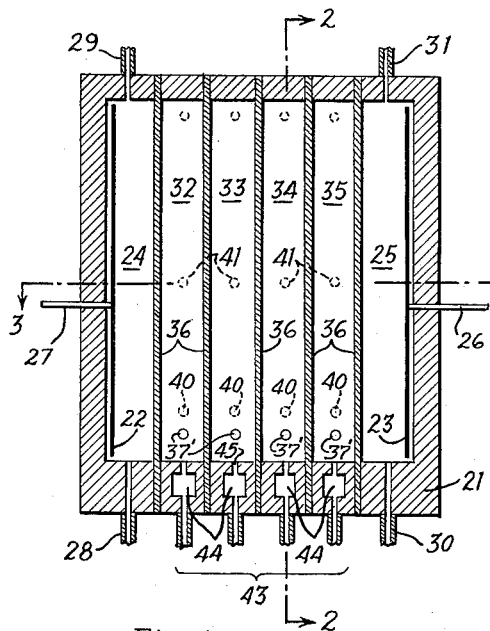
FIG. 1 is a vertical section through an apparatus embodying the invention, the section being taken on line 1—1 of FIG. 2.

In the following description, and in the claims, various details will be identified by specific names for convenience. The names, however, are intended to be generic in their application. Corresponding reference characters refer to corresponding parts in the several figures of the drawings.

The drawings accompanying, and forming part of, this specification disclose certain specific details of the invention for the purpose of explanation of its broader aspects, but it is understood that the details may be modified in various respects without departure from the principles of the invention and that the invention may be applied to other structures than those shown.

In accordance with the invention, the fluid mixture to be fractionated is passed through an apparatus comprising, basically, a housing within which the ions of the fluid are electrically driven to encounter successive zones of different ionic concentration as they pass through the housing. Such zones may be represented by layers of ion exchange material, layers of ionic liquid, or porous substances, sometimes referred to as "ion exchange filler." Layers of ion exchange material may be bonded together to form membranes, or they may be compressed or loose ion exchange particles of granular or bead form held in place by a suitable grids, screening, or spacers to remain in the form of a layer. The body of ion exchange material may be anionic, cationic, or amphoteric, either by reason of an inherent property of the particles, or by reason of being composed of a mixture of anion particles and cation particles.

The aforesaid layers or barriers subdivide the housing into compartments through which the fluid to be fractionated is directed. The barriers are so arranged as to extend substantially parallel to the force of acceleration, gravity, or centrifugal force, excluding the position in which the barriers are at right angles to such mechanical force. This arrangement permits the concentration or dilution layers forming along the surfaces of the barriers to follow the influence of a mechanical accelerating force. In the case of gravity, lighter fluid tends to move up and heavier fluid tends to move down. As will be seen from the following description, a donee liquid is introduced which spreads out the various components over an enlarged zone or range within the housing, permitting individual components to be withdrawn separately.

The compartments may be void spaces between layers of ion exchange material, for example membranes, through which spaces the liquid is directed, but the spaces may also contain a macroporous filler of an inert or of active material through which the fluid flows. An inert filler may consist of glass beads or glass fibers, and an active filler may be composed of particles of ion exchange material having a concentration of ions of a certain polarity differing from the concentration of at least one of the bordering barriers with respect to said certain ions. Thus, the filler and the respective barrier may both be cationic, or both may be anionic, or one may be anionic and the other cationic. One may also be of a certain polarity and the other one may be amphoteric. Both may even be amphoteric, as long as the concentration of ions of a certain polarity is different, so that ions passing from one space or compartment into the other encounter a difference in the ambient ionic concentration.

Figure 2:
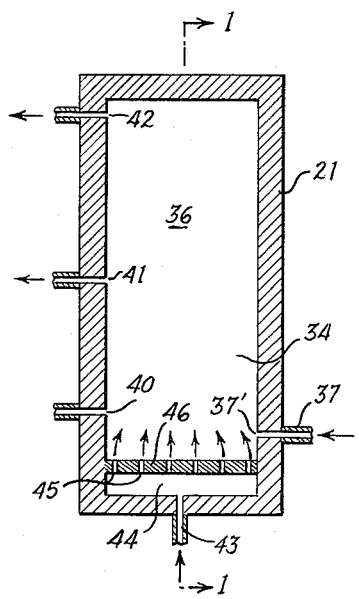
FIG. 2 is a vertical section through the apparatus taken on line 2—2 of FIG. 1.
Figure 3:
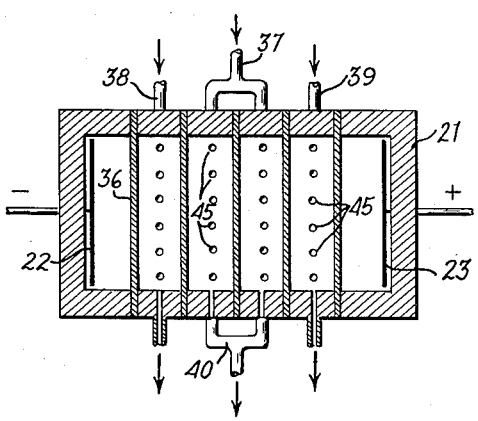
FIG. 3 is a horizontal section through the apparatus of FIG. 1, the section being taken on line 3—3 of FIG. 1.

The apparatus shown mainly in diagrammatic form in FIGS. 1 to 3 comprises a housing 21 within which a cathode 22 and an anode 23 are arranged in electrode chambers 24 and 25. Leads 26 and 27 extend from the electrodes to suitable sources of direct electrical potential (not shown). Ducts 28, 29, 30 and 31 serve to supply electrolyte into, and remove electrolyte from, the electrode chambers 24 and 25.

The space between the electrode chambers 24 and 25 is taken up by treatment chambers of which four chambers 32, 33, 34 and 35 are shown by way of example, it being understood that the number may be considerably greater.

The treatment chambers are separated from one another and from the electrode chambers by barriers 36 of ion exchange material. These barriers may have the form of membranes, and it may first be assumed that all barriers are of the same polarity, for example anion permeable and cation passage resistant. As will later be seen, the barriers may also be cationic or anionic and cationic, arranged in a certain sequence.

The treatment chambers may be grouped into main treatment chambers 33 and 34 yielding the purest products and guard chambers 32 and 35 which lie between the treatment chambers 33 and 34 and the electrode chambers and guard the treatment chambers against contamination by ions originating in the electrode chambers.

Each treatment chamber has a supply port or duct at one end of the chamber through which port or duct mixture enters and a plurality of withdrawal ducts or ports at the opposite end for withdrawal of volumes of liquid containing the constituents in different ratios. A main inflow duct 37 is manifolded to feed mixture into the treatment chambers 33 and 34 at inflow ports 37'. The same or different liquid may be fed into the guard chambers 32 and 35 through supply ducts 38 and 39.

Three withdrawal ducts 40, 41 and 42 extend from the opposite end of the chambers 33 and 34 for withdrawal of fractions from corresponding bottom, intermediate and top zones of the chambers. The guard chambers may also be provided with three corresponding withdrawal ducts so as to maintain the conditions in the guard chambers as nearly equal to the conditions in the treatment chambers 33 and 34 as possible.

The operation of the apparatus is best explained by an example. It may be assumed that an aqueous solution containing 0.1 N KF, 0.3 N NaCl and 0.05 N LiCl is to be fractionated. In this case all barriers may be anion permeable and cation passage resistant. Passage of the anions through the membrane causes an ionic concentrate to form at the membrane surfaces at which the anions emerge from one membrane into the liquid in the next chamber. The concentrate layer forming along the membrane surface is under the influence of the gravitational force and tends to settle to the bottom of the chamber, and within the concentrate ions of lowest mobility arrange themselves above ions of greater mobility. Li is predominantly recovered from the top layer 42, K is found in the bottom layer 40, and Na is found near the middle at 41. The withdrawal rates of the fractions are so adjusted that the fraction flows contain the desired component only, or at least predominantly.

Supply ducts 43 extend into the housing 21 from the bottom, the arrangement being preferably such that the upward flow of a donee liquid fed into the compartment is uniform. For this purpose manifold chambers 44 may be provided from which the donee liquid enters the respective treatment chamber through small apertures 45 in the wall 46. In place of the perforated wall 46 a screen may be used.

The donee liquid is preferably the solvent liquid of the mixture, in the present example water. It may be supplied from a separate source, but is preferably the solvent liquid remaining after recovery of the constituents of any fraction, for example the lightest fraction withdrawn at the top. The recovery of solids may be effected by electrodialysis, distillation or any other manner yielding also the solvent which may then be reintroduced into the process as donee liquid.

The donee liquid withdraws ions from the concentrate pool which tends to settle at the bottom and carries such ions to elevated zones within the cell. Ions of low ionic mobility are carried to higher zones than ions of higher ionic mobility which tend to accumulate at a lower stratum. The flow of the donee liquid spreads the fractions out over a considerable vertical range and the fractions are more effectively separated and more easily withdrawn than if the donee liquid were not introduced.

The volumetric and flow rates of the donee liquid depend on the specific circumstances of each case and must be held below the rates at which distinct fractions are no longer recoverable at spaced withdrawal points. This condition is readily ascertainable by tests.

Cations from the electrode compartment 25 may leak through the membrane 36 and enter the guard compartment 35. The cations are fractionated and are withdrawn through the respective withdrawal ducts of the guard compartment.

Anions originating in the electrolyte within the cathode chamber 24 enter the guard compartment 32 and are fractionated therein.

The preferred spacing of the membranes 36 is between ½ and 20 mm. and the number of compartments within the main treatment section may be very large and may number several hundreds or thousands. The number of the guard compartments is selected large enough to cause the ions originating in the respective electrode compartment to arrive at the main treatment chambers in fractionated order, or large enough to insure their removal before reaching the treatment chambers 33, 34.

Figure 4:
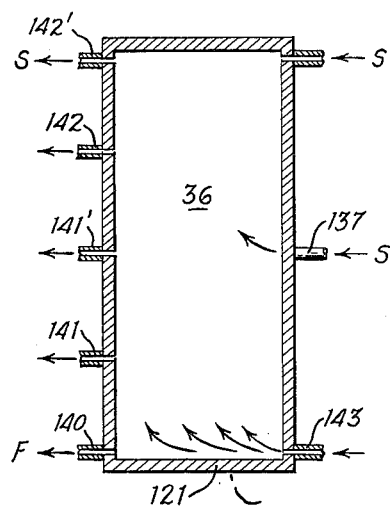
FIG. 4 is a vertical section similar to the view of FIG. 2 of a modified form of apparatus.

In the apparatus of FIG. 4 the mixture enters through an inflow duct 137 and donee liquid is supplied through duct 143. Five withdrawal ducts 140, 141, 141', 142 and 142' are indicated in the housing 121. Except for the modified location of the donee inflow duct 143 and the omission of a liquid pervious wall above the donee inflow, the construction and operation of the apparatus corresponds to that shown in FIG. 2.

Figures 5, 6, 7:
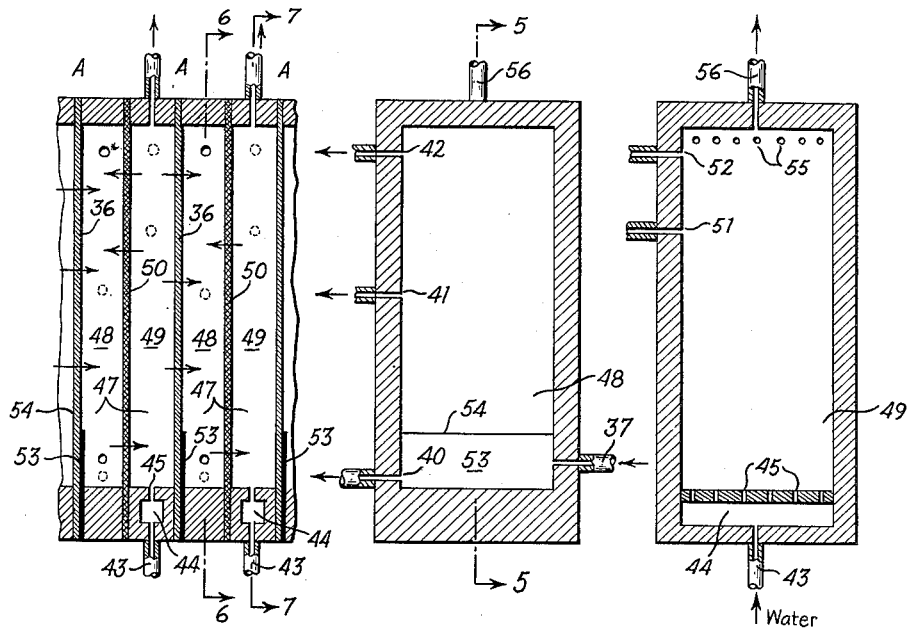
FIG. 5 is a vertical section through a modified form of apparatus, the section being taken on line 5—5 of FIG. 6.
FIG. 6 is a section through the apparatus of FIG. 5, the section being taken on line 6—6 of FIG. 5.
FIG. 7 is a section through the apparatus of FIG. 5, the section being taken on line 7—7 of FIG. 5.

FIG. 5 illustrates a modification of the treatment chambers. The treatment chamber 47 is divided into a first portion 48 and a second portion 49 by a hydraulic, but ionically neutral barrier 50. This barrier has no ionically selective function and may therefore consist of ionically neutral material, such as cellophane. Its purpose is to permit free distribution of ions within the chamber portions 48 and 49 while yet maintaining a certain hydraulic separation of the liquid volume contained in the first portion 48 from the second portion 49 so that donee liquid supplied through the duct 43 and passages 44, 45 may flow in an upward direction without hydraulic disturbance of the liquid within the first chamber portion 48. The treatment chambers are separated by barriers 36 of a certain ionic concentration which, as in the example of FIG. 1, may be anion membranes. The chamber portion 49, or both portions 48 and 49, may contain a filler of ion exchange material, for example a mixture of anion beads and cation beads. The fluid to be separated enters through the duct 37 leading to the chamber portion 48 from which product ducts 40, 41 and 42 extend at different levels. The chamber portion 49 into which the donee liquid is directed also has two product ducts 51 and 52.

An insulating barrier 53 is shown extending from the bottom portion of the compartments to a level 54. The insulating barrier may consist of polyethylene sheet material, and its purpose is to prevent passage of current through the concentrate accumulation at the bottom. This reduces the energy consumption and further permits concentrate to pass freely through the hydraulic barrier 50 into the bottom portion of the chamber portion 49 where it is then swept upward by the flow of the donee liquid. Once lifted above the level 54 the ions are again under the influence of the potential and are being urged back towards the membranes 36.

The neutral barrier 50 may be provided with perforations 55 at the top to permit the dilute accumulating at the top of the chamber 48 to pass freely to an outlet duct 56 extending from the chamber portion 49.

Figure 8:
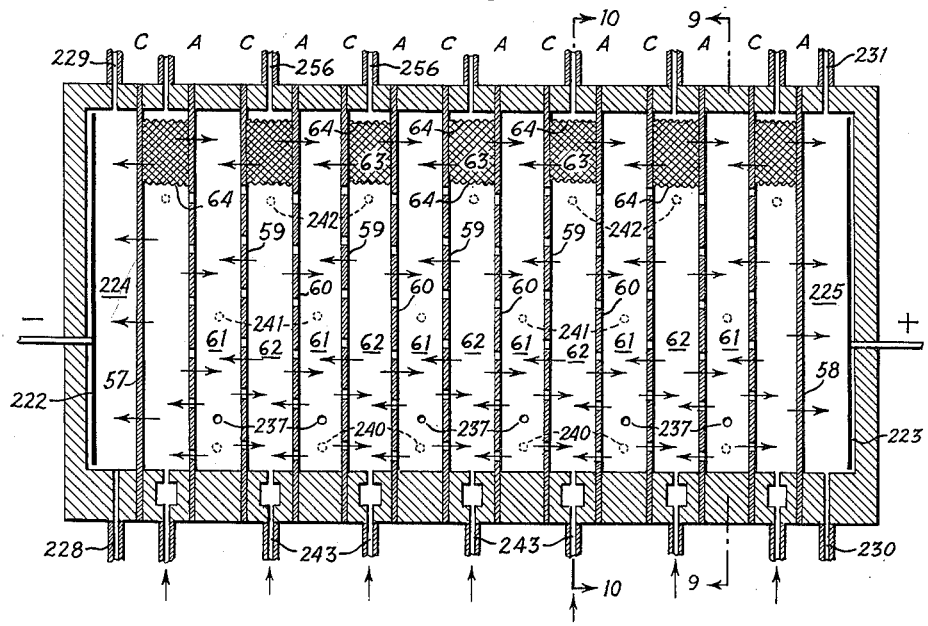
FIG. 8 is a vertical section through an apparatus employing perforated barriers, the section being taken on line 8—8 of FIG. 9.
Figure 9:
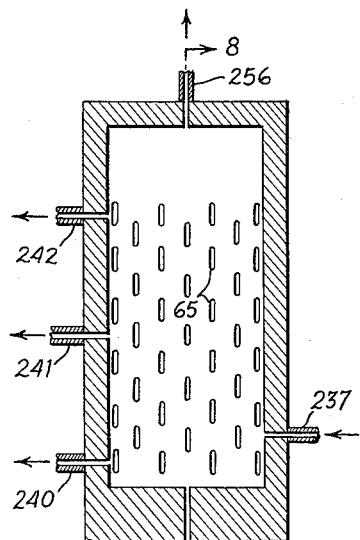
FIG. 9 is a section taken on line 9—9 of FIG. 8.
Figure 10:
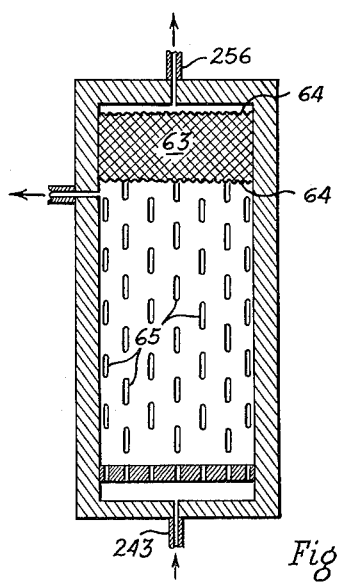
FIG. 10 is a section taken on line 10—10 of FIG. 8.

The apparatus shown in FIG. 8 comprises a housing 221 containing electrodes 222 and 223. The housing is subdivided into individual treatment chambers by a plurality of permselective membranes of two polarities arranged in alternating sequence so that a cation membrane follows an anion membrane and, in turn, is followed by an anion membrane, and so forth. The cathode chamber 224 is closed by a cation membrane 57, whereas the anode chamber 225 is closed by an anion membrane 58. The remaining membranes, namely cation membranes 59 and anion membranes 60 are provided with perforations, preferably in the form of elongated slots, the area of the perforations being preferably between one and ten per cent of the total membrane area. The membranes closing the electrode chambers are not perforated.

The membrane sequence makes every other chamber a concentration chamber 61 while the chambers lying between the concentration chambers become deionization chambers 62.

Liquid to be treated is supplied into the concentration chambers through ducts 237 and donee liquid enters the deionization chambers through ducts 243. Product fractions are withdrawn from the concentration chambers through ducts 240, 241 and 242 spaced in the direction of the accelerating force acting on the fractions, in the present case gravitational force.

The electrode chambers are provided with supply and withdrawal ducts 228, 229, 230 and 231, respectively. The top portion of the deionization chambers contains an ion conductive filler 63 held in place by plastic screening 64, for example of Saran plastic. The filler is preferably amphoteric and may consist of a mixture of cationic and anionic ion exchange resin beads. The purpose of the filler is to provide a low resistance path for electric current through the upper portion of the apparatus where normally a low ionic concentration prevails. The portion of the membranes contacted by the filler is not perforated and the electric current passing through the upper portion of the apparatus causes the ions to move through the filler through the bordering membranes into the concentration chambers so as to prevent a loss of ions by discharge through the discharge ducts 256 extending from the top of the dilution chambers.

In the operation of the apparatus, concentrate accumulates in the concentration compartments 62 whence it leaks through the perforations 65 into the adjoining dilution chambers. The donee liquid directed into the dilution chambers carries the ions of the concentrate to elevated levels, slower ions being moved to higher levels than faster ions before the action of the electric current moves the ions back into the concentration compartments through the selective membranes. By this process the fractions are vertically separated and are then removed through the fraction withdrawal ducts 240, 241 and 242.

The vertical or tower type apparatus shown in FIGS. 11 to 17 comprises a housing 66 containing an anode 67 at the top and a cathode 68 at the bottom. A cation membrane 69 closes the anode chamber 72 which has an inflow duct 70 and an outflow duct 71 for electrolyte.

The cathode chamber 73 is closed by an anion membrane 74 and ducts 75 and 76 are provided for the supply and discharge of electrolyte.

The portion 77 of the housing between the electrode chambers is subdivided by a plurality of anion membranes 78, all of which are inclined to the horizontal by any desired angle, for example 15 degrees. This obviously may be accomplished by inclining the entire housing or by mounting the membranes at a slant in a vertical housing.

Figure 12:
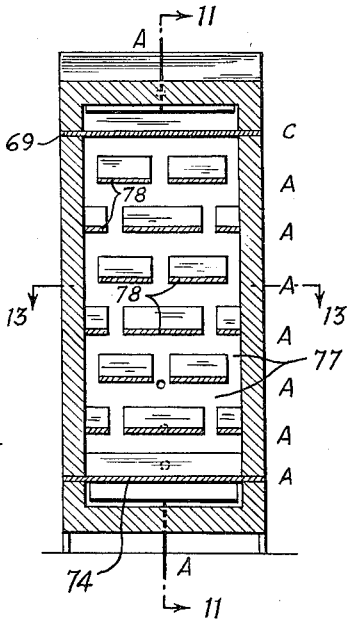
FIG. 12 is a section taken on line 12—12 of FIG. 11.

The anion membranes 78 are slotted, preferably in such a way that the slots in adjacent membranes are staggered as shown in FIG. 12.

Solution or mixture to be treated is introduced into the treatment portion 77 through a supply duct 79 and fractions are withdrawn through vertically spaced ducts 80, 81 and 82. Valves 83, 84 may be provided at the anode side and similar valves 85, 86 may be provided at the cathode side to supply the anode chamber 72 and the cathode chamber 73 with electrolyte, the electrolyte being a portion of the product outflow through ducts 82 and 80, respectively. Donee liquid is introduced through a duct 87. In the operation of the apparatus ionic concentrate is formed at the top surface of the anion membrane 78. Due to the inclination of the membranes the concentrate moves to the left until it encounters a slit or aperture in the membrane through which it then drops to the next lower level under the action of gravity. A similar effect is obviously producible by centrifugal force.

The donee liquid introduced through the duct 87 sweeps the concentrate in an upward direction with the result that slower ions are displaced to a greater extent than faster ions. Thus the fastest ions are recoverable through the duct 80 whereas the slowest ions are recoverable through the duct 82.

Figure 13:
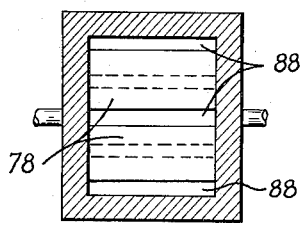
FIG. 13 is a section taken on line 13—13 of FIG. 12.
Figure 14:
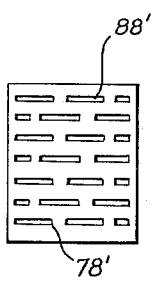
FIG. 14 shows a modification of the slotted membrane arrangement of FIG. 13.

The slots 88 in the barriers need not extend from end to end as shown in FIGS. 12 and 13, but may be shorter as shown at 88' in FIG. 14. The membrane 78' of FIG. 14 may be considered perforated, whereas the slot arrangement of FIG. 13 may be produced by spaced membrane strips.

Figure 15:
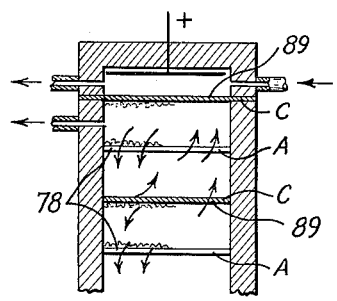
FIG. 15 is a sectional view similar to the view of FIG. 11 of the top portion of a modified form of apparatus employing permselective barriers arranged in alternating order.
Figure 16:
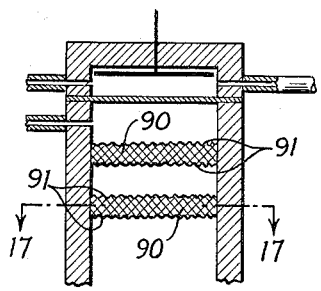
FIG. 16 illustrates still another modification of the apparatus employing permselective barriers composed of ion exchange particles.
Figure 17:
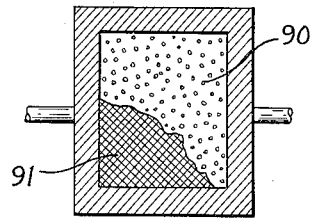
FIG. 17 is a section taken on line 17—17 of FIG. 16.

A modification of the apparatus shown in FIG. 15 is characterized by an alternating arrangement of anion membranes 78 and cation membranes 89. In place of membranes with slits 88 or perforations 88', layers of granular or bead type ion exchange material may be employed, as shown in FIGS. 16 and 17. The layers 90 are held in place by screens 91 of an inert plastic material, such as Saran, and the polarity of alternating barriers may correspond to that shown in FIGS. 11 and 15.

The specific form and arrangement of the bodies of ion exchange material along whose surfaces the concentration and dilution layers, or rather the layers of heavier and lighter liquid, form is of no particular moment, as long as the arrangement is such that the flows of lighter and heavier liquid are free to move in opposite directions substantially without interfering with each other.

The present invention is applicable in general to the separation of constituents of a liquid capable of being separated into a lighter and a heavier fraction under the influence of an electric current. The constituents may be isotopes, or different ions of the same polarity, or may include constituents of different dielectric constant. It may include constituents of relatively poor electrical conductivity. The constituents themselves may be solids, liquids, or gaseous dissolved in liquid.

The electrolyte in the electrode chambers may be the liquid to be treated itself or another electrolyte in the event the liquid to be treated would produce undesirable electrode reactions.

PERFORMANCE EXAMPLES

*Apparatus A.*—An apparatus was constructed corresponding, in principle, to the construction shown in FIG. 1 and comprising eleven anion membranes of Amberplex, each membrane measuring 150 mm. by 150 mm., 1 mm. thick, forming ten intermediate compartments and two electrode compartments at the ends, containing platinum electrodes. Width of each intermediate compartment 2 mm., maintained by Saran screening of 2 mm. thickness and 6 mm. mesh. Inlet ports 37 were provided for each treatment chamber manifolded to a common mixture supply duct. Twelve inlet ports 45 were provided for the supply of donee liquid at the bottom of each treatment chamber, each port being a hole of 1/32 of an inch diameter. Three product discharge ducts 40, 41 and 42 were provided opposite the inlet 37. The first and the tenth treatment chambers were used as guard compartments and their outlet ducts were manifolded. The corresponding outlet ducts of the other eight treatment chambers were likewise manifolded to three outlet ducts referred to as top, center and bottom outlet ducts.

*Example I*

A mixture of equal volumes of 0.02 N KF and 0.02 N LiCl in water was the liquid to be fractionated and water was used as donee liquid. The liquid mixture was also fed into the electrode chambers to serve as electrolyte passing through each electrode chamber at a rate of 30 cc. per minute. Donee liquid was supplied at the rate of 16.25 cc. per minute. Liquid mixture was supplied to the treatment chambers at the rate of 10 cc. per minute and the outflows were adjusted to the following rates:

Top fraction: 12 cc. per minute. Center fraction: 6 cc. per minute. Bottom fraction: 3 cc. per minute. Top guard compartment outlet: 3 cc. per minute. Center guard compartment outlet: 1.5 cc. per minute. Bottom guard compartment outlet: 0.5 cc. per minute. Potential: 12 volts.

After 160 minutes of operation the fractions showed the following ratio of K to Li (in moles):
Top fraction: 0.28. Bottom fraction: 3.6.
Ratio of Cl to F (in moles):
Top fraction: 0.39. Bottom fraction: 2.6.

*Apparatus B.*—Apparatus A was modified by installation of Amberplex anion membranes and cation membranes in alternating sequence, the arrangement being as follows: cathode, cation membrane, anion membrane, cation membrane, . . . anion membrane, anode. The membranes, except for the membranes bordering the electrode chambers, were slotted to contain vertical slots measuring 2 x 10 mm., the slots being uniformly distributed over the membrane area and constituting ten percent of the membrane area.

*Example II*

The apparatus B was tested, the mixture as well as the operating conditions being the same as in Test I.
Results: Ratio of K to Li (in moles):
Top fraction: 0.32. Bottom fraction: 3.1.
Ratio of Cl to F (in moles):
Top fraction: 0.45. Bottom fraction: 2.2.

*Apparatus C.*—Apparatus A was modified to include neutral cellophane spacer membranes subdividing the space between each two permselective membranes into two spaces of 2 mm. thickness each. The spacers were maintained uniform by Saran screening of 2 mm. thickness and 6 mm. mesh size. Thickness of the cellophane membrane—0.1 mm. Membrane arrangement: anode, anion membrane, cellophane membrane, anion membrane, cellophane membrane . . . anion membrane, cathode. The membrane arrangement produced the following sequence of chambers: anode chamber, dilution compartment, concentration compartment, dilution compartment, concentration compartment, etc.

Water was supplied into the diluting compartments as donee liquid at the rate of 22.5 cc. per minute, as shown in FIG. 5. The mixture inlets as well as the fraction outlets extended into, and from, the concentrating compartments as also shown in FIG. 5. Communicating apertures were provided at the upper end of the cellophane membranes, there being twelve equally spaced holes of 2 mm. diameter within 3 mm. from the top of the compartment. A strip of 20 mm. height of polyethylene plastic sheet material was placed over the bottom portion of each selective membrane to render that portion of the apparatus nonconductive, as shown at 53 in FIG. 5.

*Example III*

Operating conditions were the same as in Example I except as follows:
Potential: 18 volts. Inflow of donee liquid: 22.5 cc. per minute.

[Cc. per minute]

| | Fraction outflow | Guard outflow |
|---|---|---|
| Top fraction | 16 | 4 |
| Center fraction | 8 | 2 |
| Bottom fraction | 2 | 0.5 |

Results: Ratio of K to Li (in moles):
Top fraction: 0.26. Bottom fraction: 3.9.
Ratio of Cl to F (in moles):
Top fraction: 0.36. Bottom fraction: 2.8.

*Apparatus D.*—Apparatus C was modified to remove the top fraction at the top of the diluting compartments through duct 56 instead of through the top outlet 52 located within the concentrating compartments.

*Example IV*

Operating conditions as in Example III.
Results: Ratio of K to Li (in moles):
Top fraction: 0.25.
Bottom fraction: 4.0.
Ratio of Cl to F (in moles): Top fraction: 0.35. Bottom fraction: 2.9.

Figure 11:
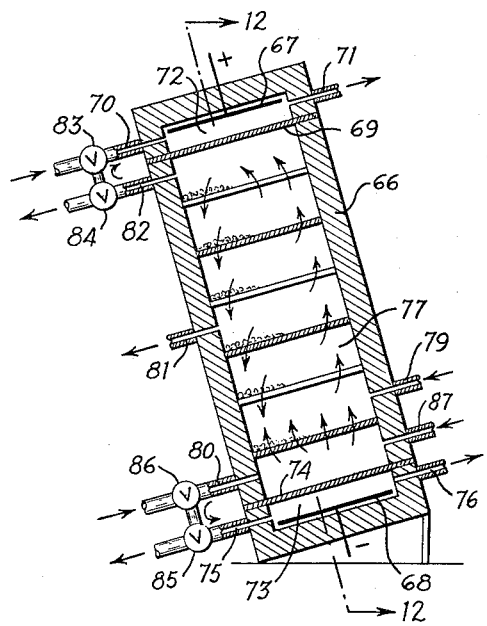
FIG. 11 is a vertical section through a vertical or tower type apparatus, the section being taken on line 11—11 of FIG. 12.

*Apparatus E.*—An apparatus was constructed according to FIG. 11 comprising 100 membrane barriers measuring 100 mm. x 100 mm. x 1 mm. of anionic Amberplex. The barriers were spaced 3 mm. apart by means of marginal spacer strips of polyethylene sheet material of 5 mm. width and 3 mm. thickness. 98 slotted membrane barriers were provided with slots 4 mm. in width, there being four slots in one barrier, three slots in the next barrier, four slots in the succeeding barrier, and so forth, the slots being staggered, as shown in FIG. 12. The anode compartment was closed by a non-slotted cation membrane of Amberplex. The cathode chamber at the bottom was closed by a non-slotted anion membrane of Amberplex. The thickness of each electrode chamber was 2 mm., maintained uniform by Saran screening of 2 mm. thickness and 6 mm. mesh size. The apparatus was titled to slant the barriers 15 degrees with respect to the horizontal.

The electrode chambers had separate inlets and outlets, as shown at 70, 71, 75 and 76. The inlet duct 87 for donee liquid extended into the bottommost treatment chamber. The inlet duct 79 for liquid to be treated extended into the third chamber from the bottom and was arranged above the inlet for the donee liquid. Three fraction outlets were provided, one extending from the second chamber from the bottom, one from the 49th chamber and one from the topmost treatment chamber, substantially as shown at 80, 81 and 82. The bottom electrode was a cathode, the top electrode an anode.

Liquid to be treated: A mixture of equal volumes of 0.2 N KF in water and 0.2 N LiCl in water.
Electrolyte: 0.1 N HCl in water.
Operating conditions: Mixture inflow 10 cc. per minute.
Fraction outflow: top: 15 cc. per minute. Center: 5 cc. per minute. Bottom: 2 cc. per minute.
Potential: 80 volts.
Electrolyte inflow: 10 cc. per minute. Donee liquid inflow: 12 cc. per minute.

*Example V*

Results: After four hours of operation:
Ratio of K to Li (in moles):
Top fraction: 0.16. Bottom fraction: 6.2.
Ratio of Cl to F (in moles):
Top fraction: 0.21. Bottom fraction: 4.8.

*Apparatus F.*—Apparatus similar to apparatus E except that anion membranes and cation membranes of Amberplex were installed in alternating sequence, beginning with cation membrane separating the anode chamber at the top from the topmost treatment chamber. The cation membrane was followed by a slotted anion membrane, followed by a slotted cation membrane, and so forth. The cathode chamber at the bottom was closed by a non-slotted anion membrane. The anode chamber was supplied with electrolyte taken from the top fraction outflow and the cathode chamber was supplied with liquid from the bottom fraction outflow. The valves 83, 84, 85 and 86 were so adjusted as to cause the top fraction to flow through the anode chamber and serve as anolyte and that the bottom fraction would flow through the cathode chamber and serve as catholyte. Flow rates as in Example V. Potential: 90 volts.

*Example VI*

Results: After four hours of operation:
Ratio of K to Li (in moles):
Top fraction: 0.19. Bottom fraction: 5.2.
Ratio of Cl to F (in moles):
Top fraction: 0.25. Bottom fraction: 4.0.

What is claimed is:

1. In the method of separating ionic species of like polarity of an ionic solution under the influence of an electrical potential in a cell comprising spaced electrodes, and at least two spaced barriers disposed between said electrodes substantially transverse to the direction of an electric current passing from one electrode to the other, at least one of said barriers being permselective, the steps comprising, continuously introducing an ionic solution containing said species into said cell between said barriers and simultaneously providing for liquid withdrawal from said cell; applying an electrical potential at said electrodes, the polarity being such as to effect an increase in ionic concentration of the solution on one side of the permselective barrier and a decrease in ionic concentration on the side of the other barrier facing the permselective barrier, the concentrate tending, under the influence of gravity to move towards, and accumulate in the lower region of the cell to form a concentrate pool, the dilute tending to move towards the upper region of the cell; continuously introducing a solvent liquid into the lower region of the cell to withdraw by dilution ions from said concentrate pool and carry ions from said pool to zones within the cell above said pool, ions of lower ionic mobility moving to higher zones by said liquid in preference to ions of higher ionic mobility which tend to accumulate at lower zones; continuously withdrawing, as a first product, solution from a first product zone; and withdrawing, as a second product, solution from a second product zone lying above said first product zone, said two zones containing said ionic species in different relative proportions.

2. The method of claim 1 in which a plurality of spaced barriers are employed between which said solution is confined, at least certain of said barriers being passage resistant to ions of said polarity to a greater degree than to ions of the opposite polarity.

3. The method of separating ionic species of like polarity of an ionic solution under the influence of an electrical potential in a cell comprising a pair of electrodes vertically spaced so as to produce an electric current therebetween having a substantially vertical component and a plurality of spaced barriers disposed between said electrodes substantially transverse to the direction of an electric current passing from one electrode to the other, at least certain of said barriers being permselective, the method comprising the steps of continuously introducing an ionic solution containing said species into said cell into the space between said barriers; applying an electrical potential at said electrodes, the polarity being such as to effect an increase in the ionic concentration of the solution at one surface of a permselective barrier and a decrease in ionic concentration on the surface of the next barrier facing said one surface, said barriers being slanted and provided with a liquid passage for convection downflow of concentrate from one side of one barrier past said one barrier to its other side in one direction, and convection upflow of dilute in the opposite direction, whereby, under the influence of gravity, flow of concentrate occurs towards, and accumulation of concentrate in, the lower region of the cell and flow of dilute towards the upper region of the cell; continuously introducing a solvent liquid into the concentrate within the lower region of the cell to dilute by the donee solution said concentrate and move ions from the concentrate to elevated zones within the cell, ions of lower ionic mobility being transferred to higher zones by said liquid than ions of higher ionic mobility which tend to accumulate below the slower ions; continuously withdrawing, as a first product, solution from a first product zone within the cell; and withdrawing, as a second product, solution from a second product zone spaced from said first product zone in the direction of flow of electric current from electrode to electrode, said two zones containing the ionic species in different relative proportions.

4. The method of claim 3 in which a plurality of spaced permselective barriers of like polarity is employed.

5. The method of claim 3 in which a plurality of spaced permselective barriers of such polarity is employed that the barriers are selectively passage resistant to ions of the polarity of the species to be separated.

6. The method of claim 3 in which a plurality of spaced barriers of two types are employed, said types being arranged in alternating sequence, one type being passage resistant to anions to a greater degree than to cations, the other type being passage resistant to cations to a greater degree than to anions.

7. The method of claim 3 in which flows of electrolyte are directed past the electrodes and are separated from the flows of the ionic solution and of the solvent solution by ion permeable membranes defining electrode chambers.

8. The method of separating ions of a certain polarity as set forth in claim 3 in which flows of electrolyte are directed past the electrodes and are separated from the flows of the ionic solution and of the solvent solution by ion permeable membranes defining electrode spaces and in which the fraction of slow ionic mobility is introduced into the electrode chamber containing the electrode of said polarity, said electrode chamber being at a higher level than the electrode chamber containing the electrode of the opposite polarity.

9. The method of separating ions of a certain polarity as set forth in claim 3 in which flows of electrolyte are directed past the electrodes and are separated from the flows of the ionic solution and of the solvent solution by ion permeable membranes defining electrode spaces and in which the fraction of highest ionic mobility is introduced into the electrode chamber containing the electrode of said certain polarity, said electrode chamber lying at a lower level than the electrode chamber containing the electrode of the opposite polarity.

10. In the method of separating ionic species of like polarity of an ionic solution under the influence of an electrical potential in a cell comprising spaced electrodes, and at least two spaced barriers disposed between said electrodes substantially transverse to the direction of an electric current passing from one electrode to the other, at least one of said barriers being permselective, the steps comprising, continuously introducing an ionic solution containing said species into said cell between said barriers; applying an electrical potential at said electrodes, the polarity being such as to effect an increase in ionic concentration of the solution on one side of the permselective barrier and a decrease in ionic concentration on the side of the other barrier facing the permselective barrier, the concentrate tending, under the influence of gravity to move towards, and accumulate in the lower region of the cell to form a concentrate pool, the dilute tending to move towards the upper region of the cell above the pool; and continuously introducing a solvent liquid into said concentrate pool to dilute at least a portion of the concentrate and displace ions of the concentrate by such dilution to elevated zones within said cell, ions of lower ionic mobility moving to higher zones by said liquid in preference to ions of higher ionic mobility which tend to accumulate at lower zones; continuously withdrawing, as a first product, solution from a first product zone; and withdrawing, as a second product, solution from a second product zone lying above said first product zone, said two zones containing said ionic species in different relative proportions.

11. In the method of separating ionic species of like polarity of an ionic solution under the influence of an electrical potential in a cell comprising spaced electrodes, at least two spaced barriers disposed between said electrodes substantially transverse to the direction of an electric current passing from one electrode to the other, at least one of said barriers being permselective, and a subdividing non-selective membrane permeable to ions of both polarities between said barriers dividing the space between said barriers into a first chamber adjacent said one barrier and a second chamber, the steps comprising, continuously introducing an ionic solution containing said species into one of said chambers; applying an electrical potential at said electrodes, the polarity being such as to effect an increase in ionic concentration in said one chamber and a decrease in ionic concentration in the other chamber, the concentrate tending, under the influence of gravity, to move towards and form a concentrate pool in the lower region of said one chamber whence it leaks into the other chamber through said subdividing membrane; and continuously introducing a solvent liquid into the concentrate in said second chamber to withdraw ions from said concentrate and lift such withdrawn ions to elevated zones within said cell, ions of lower ionic mobility being transferred to higher zones by said liquid in preference to ions of higher ionic mobility which tend to accumulate at lower zones; continuously withdrawing, as a first product, solution from a first product zone; and withdrawing, as a second product, solution from a second product zone lying above said first product zone, said two zones containing said ionic species in different relative proportions.

12. The process of claim 11, wherein product solutions are withdrawn from points within said one chamber.

13. In the method of separating ionic species of like polarity of anionic solution under the influence of an electrical potential in a cell comprising spaced electrodes, and at least two spaced barriers disposed between said electrodes substantially transverse to the direction of an electric current passing from one electrode to the other, at least one of said barriers being permselective, the steps comprising, continuously introducing an ionic solution containing said species into said cell between said barriers; applying an electrical potential at said electrodes, the polarity being such as to effect an increase in ionic concentration of the solution on one side of the permselective barrier and a decrease in ionic concentration on the side of the other barrier facing the permselective barrier, the concentrate tending, under the influence of gravity, to move towards, and accumulate in the lower region of the cell to form a concentrate pool, the dilute tending to move towards the upper region of the cell above such pool; continuously introducing a solvent liquid into the concentrate pool to displace ions from at least a portion of the concentrate and move such withdrawn ions to elevated zones within the cell above the pool, ions of lower ionic mobility moving to higher zones by said liquid in preference to ions of higher ionic mobility which tend to accumulate at lower zones; continuously withdrawing, as a first product, solution from a first product zone; and withdrawing, as a second product, solution from a second product zone lying above said first product zone, said two zones containing said ionic species in difference relative proportions.

14. In the method of separating ionic species of like polarity of an ionic solution under the influence of an electrical potential in a cell comprising spaced electrodes, and at least two spaced barriers disposed between said electrodes substantially transverse to the direction of an electric current passing from one electrode to the other, at least one of said barriers being permselective, the steps comprising, continuously introducing an ionic solution containing said species into said cell between said barriers; applying an electrical potential at said electrodes, the polarity being such as to effect an increase in ionic concentration of the solution on one side of the permselective barrier and a decrease in ionic concentration on the side of the other barrier facing the permselective barrier, the concentrate tending, under the influence of gravity to move towards, and accumulate in the lower region of the cell to form a concentrate pool, the dilute tending to move towards the upper region of the cell above said pool; continuously introducing a solvent liquid into the concentrate pool to displace ions from at least a portion of the concentrate pool and move such ions to elevated zones within the cell, ions of lower ionic mobility being transferred to higher zones by said liquid in preference to ions of higher ionic mobility which tend to accumulate at lower zones; continuously withdrawing, as a first product, solution from a first product zone; and withdrawing, as a second product, solution from a second product zone lying above said first product zone, said two zones containing said ionic species in different relative proportions, the said second zone being located above the level of solvent liquid inflow.

15. The method of separating ionic species of like polarity of an ionic solution under the influence of an electrical potential in a cell comprising horizontally spaced electrodes and a plurality of spaced barriers of two types disposed between said electrodes substantially transverse to the direction of an electric current passing from one electrode to the other, said two types being arranged in alternating sequence, one type being permeable to ions of one polarity and passage resistant to ions of the opposite polarity, the other type being permeable to ions of the said opposite polarity, the method comprising the steps of continuously introducing an ionic solution containing said species into said cell between said barriers; applying an electrical potential to said electrodes to effect an increase in ionic concentration in certain spaces between barriers and a decrease in ionic concentration in other spaces, the concentrate tending, under the influence of gravity, to move towards and accumulate in the lower region of the cell as a concentrate pool, the dilute tending to move towards the upper region of said cell above said pool; continuously introducing a solvent liquid into the concentrate pool to displace ions from the concentrate and move such ions to elevated zones within the cell, ions of lower ionic mobility being transferred to higher zones by said liquid in preference to ions of higher ionic mobility which tend to accumulate at lower zones; continuously withdrawing, as a first product, solution from a first product zone; and withdrawing as a second product, solution from a second product zone lying above said first product zone, said zones containing said species in different relative proportions.

16. The method of claim 15 in which the barriers are constructed with liquid passages across the barriers to permit concentrate collecting in the lower portion of a concentrating space to flow into the adjoining dilution space and to permit the dilute collecting in the upper portion of a diluting space to flow into adjoining concentrating space.

17. The method of claim 15 in which, in addition, a dilute liquid is introduced into the top portion of at least certain concentration spaces, the ionic concentration of the said dilute liquid being no higher than prevailing in the top portion of the respective adjoining dilution space.

18. The method of claim 15 in which, in addition, a dilute liquid is introduced into the top portion of at least certain concentration spaces, said dilute liquid being withdrawn from the top portion of at least certain of the dilution spaces.

References Cited in the file of this patent

UNITED STATES PATENTS

| | | |
|---|---|---|
| 2,566,308 | Brewer | Sept. 4, 1951 |
| 2,801,962 | Polson | Aug. 6, 1957 |